Nov. 26, 1963  W. O. BENNING  3,112,467
SAFETY BELT INDICATING DEVICE
Filed July 11, 1962

INVENTOR.
WILBERT O. BENNING
BY Albert L. Jeffers
ATTORNEY

United States Patent Office 3,112,467
Patented Nov. 26, 1963

3,112,467
SAFETY BELT INDICATING DEVICE
Wilbert O. Benning, 3000 Nuttman Ave., Ext.,
Fort Wayne, Ind.
Filed July 11, 1962, Ser. No. 209,049
4 Claims. (Cl. 340—52)

This invention relates in general to an indicating device, and more particularly it relates to an indicating device used with safety seat belts adapted to be mounted in a motor vehicle.

The primary object of this invention is the provision of a visual indicating means or signal which is visible to the driver and passengers in the motor vehicle, to inform the driver whether or not the safety seat belts are properly fastened. In all likelihood legislation will be adopted to require the use of safety seat belts due to the fact that it has been established that a great many lives can be saved by their use. Therefore, it is an object of this invention to provide a visual indicating means which can be observed outside of the automobile by enforcement officials.

It is a further object of this invention to provide an indicator which may be installed as original equipment or can be installed as an accessory or optional equipment on existing safety seat belts.

A still further object of this invention is to provide an indicator for safety seat belts which is automatic in its operation and requires substantially no adjustment or maintenance by the owner of the motor vehicle.

Another object of the invention is to provide a safety seat belt indicator which is relatively inexpensive to manufacture, and easy to install in any motor vehicle having safety seat belts.

One embodiment of suitable structure by means of which the above mentioned, and other advantages of the invention, may be obtained will be described in the following specification taken in conjunction with the accompanying drawing showing a preferred illustrative embodiment of the invention, in which.

Figure 1:
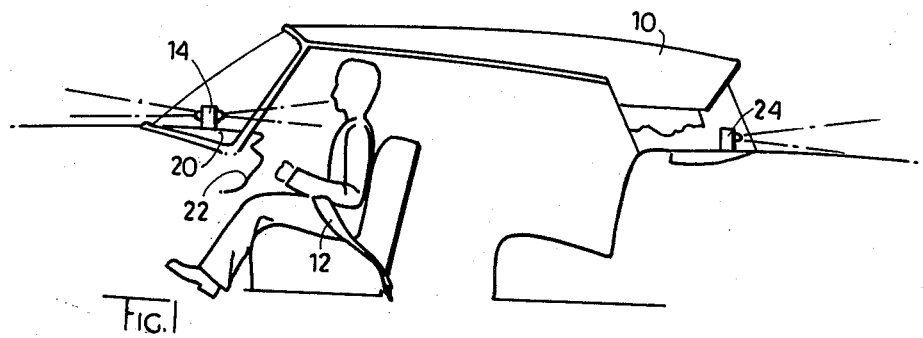
FIGURE 1 is a side view showing one embodiment of the safety seat belt indicator as applied to the front and rear of a motor vehicle.

Referring to FIGURE 1, the reference numeral 10 designates an automobile with parts removed to illustrate the mounting of safety seat belts 12 and 13 therein. A glow lamp or indicator 14 provided with an amber light 16 and a green light 18 is mounted on the ledge 20 of the instrument panel 22, and positioned near the left hand side of the windshield so as not to obstruct the vision of the driver. The precise location for the mounting of the indicator or glow lamp 14 is not critical, the prime purpose being to locate the indicator so that it will be visible to the driver of the motor vehicle as well as to others outside of the automobile. A second glow lamp 24 is installed or mounted behind the rear seat so that it is visible through the rear window of the motor vehicle. Again, the precise location of the indicating signal may be varied as the prime purpose is to locate the indicator so that it is visible to law enforcement officials or to other persons who may be checking the motor vehicle to determine whether or not the safety seat belts are being properly used. For example, insurance companies will grant lower insurance rates for motor vehicles equipped with safety seat belts, and particularly to taxicabs and commercial concerns using safety seat belts. In such event the insurance company would make periodic checks on the insured to determine whether or not the safety seat belts were being properly used and thus determine whether or not the insured would be entitled to the lower insurance rate.

Figure 2:
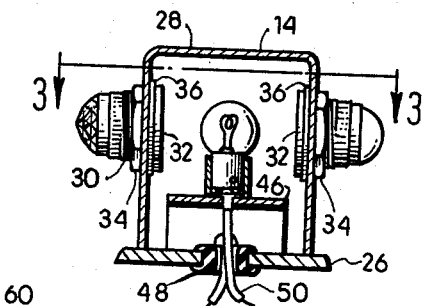
FIGURE 2 is a detail cross-sectional view of the glow lamp used as the front indicator in FIGURE 1.
Figure 3:
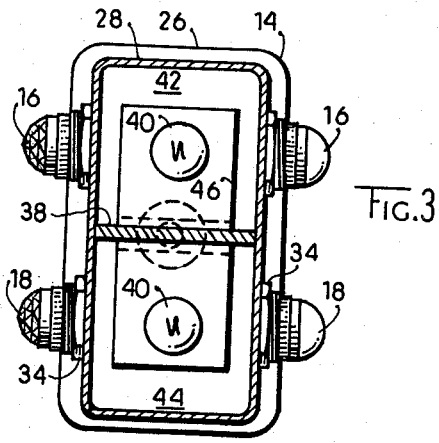
FIGURE 3 is a cross-sectional view taken along line 3—3 in FIGURE 2.

Referring to FIGURES 2 and 3, the reference numeral 26 designates a mounting provided with a housing 28 to support the indicators or glow lamps 16 and 18. The indicators 16 and 18 are provided with a threaded portion 30 and a flange 32. The indicators 16 and 18 are secured to the housing 28 by means of a nut 34 and lock washer 36. A partition or shield 38 is disposed intermediate the housing to separate the green light 18 from the amber light 16. A conventional light bulb 40 is mounted in each compartment 42 and 44, by means of a bracket 46 which serves as a ground for each bulb. A rubber grommet 48 is disposed in the base 26 to support a hot wire or lead 50.

Figure 4:
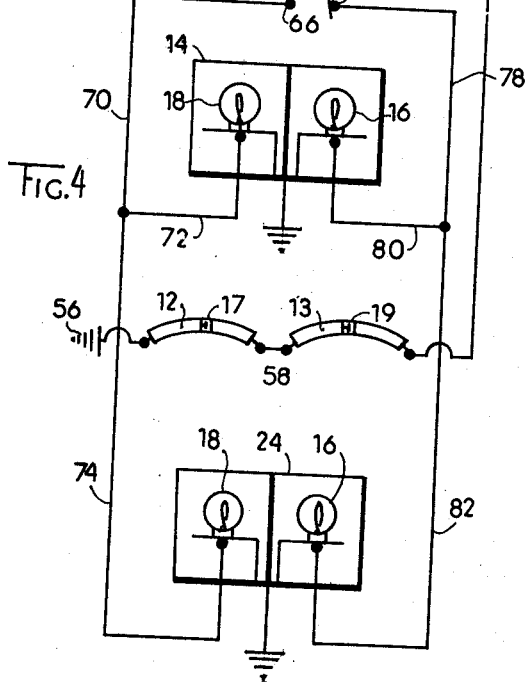
FIGURE 4 is a schematic electrical diagram illustrating the circuits of the indicator.

Referring to FIGURE 4, the reference numeral 52 designates a low voltage relay selector switch which is connected to the battery through the manual ignition switch 54 of the motor vehicle 10. The seat belts 12 and 13 are provided with a conductive wire which may be woven into the fabric of the belt so that when the buckle of each belt is fastened a circuit is established from the ground 56 to the battery, through the belt 12, line 58, belt 13, line 60, relay 52, line 62 and switch 54 whereby the relay 52 will be energized transferring the switch blade 64 to contact 66. A circuit will be established from the battery to the green indicator 18 in the front indicator 14, through the switch 54, line 62, line 68, contact 66, line 70 and line 72. The light 18 of the back indicator 24 will be energized through line 74 which is connected in series with line 70.

If the buckle 17 and 19 of either belt 12 or 13 is unfastened the circuit will be broken and the relay 52 de-energized thus returning the switch blade 64 to contact 76 which will establish a circuit to the amber light 16 in the front indicator 14, from the battery through switch 54, line 62, line 68, contact 76, line 79 and line 80. The amber light 16 in the back indicator 24 will also be energized through line 82 which is connected in series with line 78. When the amber light 16 is energized, the driver or the enforcement official will know that one of the seat belts is not properly fastened.

If the motor vehicle is provided with safety seat belts in the rear seat they may be connected in series with the front seat belts to indicate whether or not they are properly fastened.

The detail construction of the glow lamp 24 is not illustrated as it is substantially similar to the glow lamp 14 except that the interior indicator lights are omitted.

Operation

The front indicator 14 and back indicator 24 will be energized when the ignition switch 54 is closed to either establish a circuit to the amber light 16 or to the green light 18. If either buckle 17 or 19 of the seat belts 12 or 13 is unfastened a circuit is established through the relay switch 64 to the amber light 16. When the seat belts are properly fastened a circuit is established through the relay 52 which will energize the relay transferring the switch plate 54 to the contact 66 which will establish a circuit to the green light 18 in the front indicator 14 and to the back indicator 24. It is readily apparent that by the use of the above disclosed indicators that a driver or persons outside of the automobile can determine whether or not the seat belts are properly fastened.

In view of the foregoing description taken in conjunction with the accompanying drawing, it is believed that a clear understanding of the device will be quite apparent to those skilled in this art. A more detailed description is accordingly deemed unnecessary.

It should, of course, be understood that the description and drawing herein are illustrative merely and that various modifications and changes may be made in the structure disclosed without departing from the spirit of the invention.

I claim:
1. An indicating device for safety seat belts comprising, in combination:
   (a) a visual signal means having green and amber lights, said signal means disposed on the ledge within a motor vehicle above the motor vehicle instrument panel and adjacent to windshield,
   (b) a pair of safety seat belts adapted to be mounted in a motor vehicle,
   (c) said belts provided with means for conducting an electrical current therethrough,
   (d) electrical means adapted to pass current through said seat belts whereby when the seat belts are fastened the green light will be visible and when the seat belts are unfastened the amber light will be visible.

2. An indicating device for safety seat belts for motor vehicles comprising, in combination:
   (a) a visual signal means having green and amber lights,
   (b) said signal means being disposed on a ledge above the vehicle instrument panel and adjacent to windshield so that it will be visible to the driver of the vehicle and to others outside of the vehicle,
   (c) a pair of safety seat belts adapted to be mounted in said vehicle,
   (d) said belts provided with means for conducting an electrical current therethrough,
   (e) electrical means adapted to pass current through said seat belts whereby when the seat belts are properly fastened the green light will be visible and when the seat belts are unfastened the amber light will be visible.

3. A safety seat belt indicator for motor vehicles comprising, in combination:
   (a) a pair of safety seat belts adapted to be mounted in a motor vehicle,
   (b) said belts provided with means for passing an electrical current therethrough,
   (c) a pair of glow lamps having green and amber lights,
   (d) one of said glow lamps being disposed on a ledge above the vehicle instrument panel and adjacent to windshield and the other glow lamp disposed within the vehicle so that it is visible from the rear of the vehicle whereby said glow lamps are visible to the driver of the vehicle and to others outside of the vehicle,
   (e) electrical means including a power supply and a selector switch connected in series with said belts so that current will flow through said belts when they are properly fastened to energize the green light of the glow lamp and to energize the amber light of the glow lamp when one of the belts are unfastened.

4. A safety seat belt indicator for motor vehicles comprising, in combination:
   (a) a pair of safety seat belts adapted to be mounted in a motor vehicle,
   (b) said belts provided with means for passing an electrical current therethrough,
   (c) a pair of glow lamps having green and amber lights,
   (d) one of said glow lamps being disposed on a ledge above the vehicle instrument panel adjacent to windshield and the other glow lamp disposed so that it is visible from the rear of the vehicle whereby said glow lamps are visible to the driver of the vehicle and to others outside of the vehicle,
   (e) electrical means including a power supply, manual switch and a low voltage relay connected in series with said belts so that current will flow through said belts when they are properly fastened to energize the relay whereby a circuit to the green light of the glow lamp will be established and when one of the belts are unfastened the relay will be deenergized to establish a circuit to the amber light of the glow lamp.

References Cited in the file of this patent
UNITED STATES PATENTS

| | | |
|---|---|---|
| 2,324,419 | Nelson | July 13, 1943 |
| 2,510,115 | Jakosky | June 6, 1950 |
| 2,802,073 | Simon | Aug. 6, 1957 |
| 2,924,817 | Dawkins et al. | Feb. 9, 1960 |